Oct. 14, 1941.   R. L. ALBEE   2,258,922
MOTOR VEHICLE ACCESSORY
Filed April 4, 1939
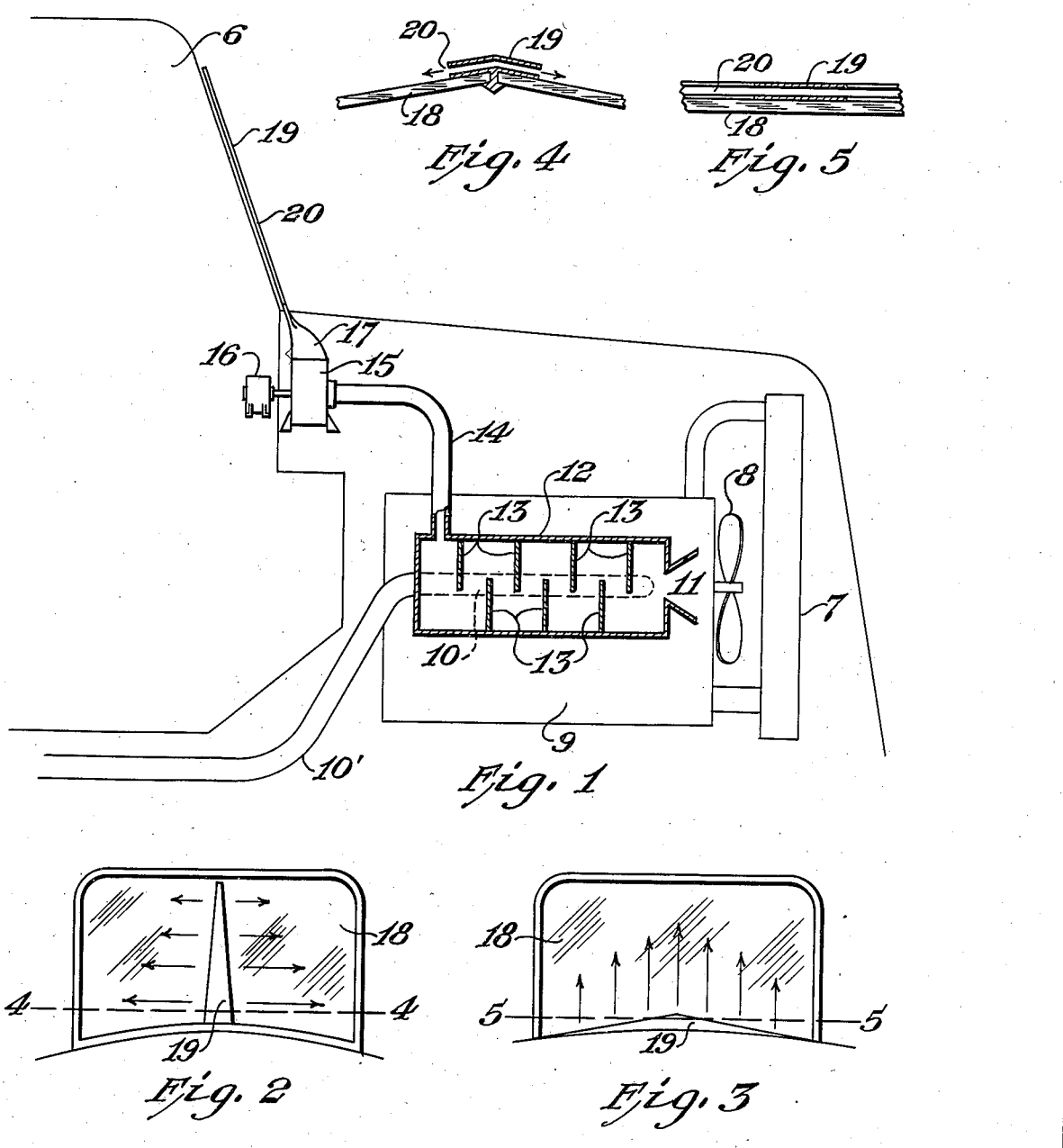
INVENTOR.
Ray L. Albee
BY R. Lyman Heindel
ATTORNEYS.

Patented Oct. 14, 1941

2,258,922

UNITED STATES PATENT OFFICE 2,258,922

MOTOR VEHICLE ACCESSORY

Ray L. Albee, Midland, Mich.

Application April 4, 1939, Serial No. 265,980

1 Claim. (Cl. 20—40.5)

This invention relates to a method of and a means for maintaining clear vision through a motor vehicle windshield under adverse low-temperature weather conditions, and particularly to such a means capable of removing or preventing the formation of frozen deposits on the windshield.

It is, accordingly, an object of the invention to provide a method and a means for maintaining clear vision through a motor vehicle windshield under adverse driving conditions. It is a further object to provide such a means whereby a stream of positively heated air is distributed over the outside of the windshield of a moving motor vehicle. It is a particular object to provide such a method and means which are effective for the purpose as soon as the engine of the motor vehicle is started, and independently of the temperature of the liquid in the motor cooling system. Other objects and advantages of the invention will appear as the description proceeds.

To the accomplishment of the foregoing and related objects, the invention, then, consists of the method and means hereinafter more fully disclosed, and set forth in the appended claim, the annexed drawing and the following description setting forth but some of the various ways in which the invention may be carried out.

In the said annexed drawing:

Fig. 1 is a side view, partially in outline and partially in section, illustrating one modification of the invention as applied to an automobile;

Fig. 2 is a front elevation of a divided windshield and one form of air distributor mounted thereon;

Fig. 3 is a front elevation of a single pane windshield and contiguous air distributor;

Fig. 4 is a transverse section along the line 4—4 of Fig. 2; and

Fig. 5 is a transverse section along the line 5—5 of Fig. 3.

The invention consists in directing a stream of air, first into heat exchange relationship with a portion of the exhaust system of an internal combustion engine, to heat the air to a temperature substantially above that of the surrounding atmosphere, and preferably to a temperature between 90° and 120° F. The so-heated air is then forced under positive pressure, as by a booster pump, or other impeller or positive circulating means, through a distributor head containing an orifice, adjusted in relationship to the windshield so that the hot air under forced circulation is distributed in a thin film-like stream substantially uniformly over a major portion of the external surface of the normal slight opening of the said windshield, maintaining the temperature of the external surface of the windshield above the freezing point of water. The invention also comprises means whereby the just described method may be successfully carried out.

In the said annexed drawing, wherein like numbers represent like parts throughout, an automobile 6 is shown in partial outline. It is to be understood that, instead of an automobile, the motor vehicle may be a motor powered train, such as the so-called "streamliners," or it may be a motor driven boat, without departing from the intended field of applicability of the invention. In a conventional automobile, having a radiator 7, through which air is drawn both by the forward motion of the car and by the fan 8, the motor 9 is provided with an exhaust manifold 10, which discharges exhaust gases into the pipe 10'. According to the invention, there is mounted over, and fitted to the exhaust manifold 10, or other convenient and usually hot portion of the exhaust system, a heat exchanger 12, having a forwardly directed opening 11 in open communication with the surrounding unheated air, through which is drawn air which has entered the engine zone through the radiator 7. The air is rapidly heated by contact with the exhaust manifold, which normally attains a temperature above 500° F. and frequently operates at a dull red heat, i. e., near 900° F. To ensure positive heating of the air to about 100° F. or higher, the heat interchanger 12 is provided with baffles 13, which direct the air through a tortuous path back and forth across the exhaust manifold. The heated air leaves the heat exchanger 12, through conduit 14 which is of a size sufficient to handle a large volume of air and which connects with a booster pump or impeller 15, suitably driven by an electric motor 16. The booster pump forces the hot air, under positive pressure upward through conduit 17 to a distributor head 19, having slots 20 arranged to distribute the air as a thin stream or film across the windshield 18.

If desired, and especially when a single pane flat or curved windshield is used instead of the two-pane windshield shown in Figs. 2 and 4, the distributor head 19 may be disposed substantially horizontally, along the bottom of the windshield, as shown in Figs. 3 and 5, the slit or orifice 20 directing a stream of air upward over the face of the windshield. Experience has shown that either of the illustrated types of distributor head will work, but that for producing a large area of clear vision in a short time under adverse driving conditions during freezing weather the modification shown in Figs. 2 and 4 is especially advantageous when the windshield is adapted to its use. Both horizontal and vertical distributors may be used, if desired. The distributor head 19 illustrated in Figs. 2 and 4 may, if desired, be constructed of transparent material, such as glass or transparent resins to avoid increasing the "blind area" of the windshield.

I claim:

An air distributor head for discharging heated air upon the external surface of both panes of the rearwardly sloping V-type windshield of a motor vehicle, said distributor having a base near the base of the windshield and a relatively narrower apex substantially above the base, the central axis of the distributor lying along the junction of the two said panes, and, extending between said base and said apex on each side of said distributor, a thin slit so disposed with respect to the pane as to direct heated air, which is expelled therethrough, solely in a thin film-like stream over substantial portions of and contiguous to the respective panes of the said windshield.

RAY L. ALBEE.